P. T. LENNON.
IMPLEMENT FOR DRAWING METAL.
APPLICATION FILED DEC. 12, 1914.
1,177,877.
Patented Apr. 4, 1916.
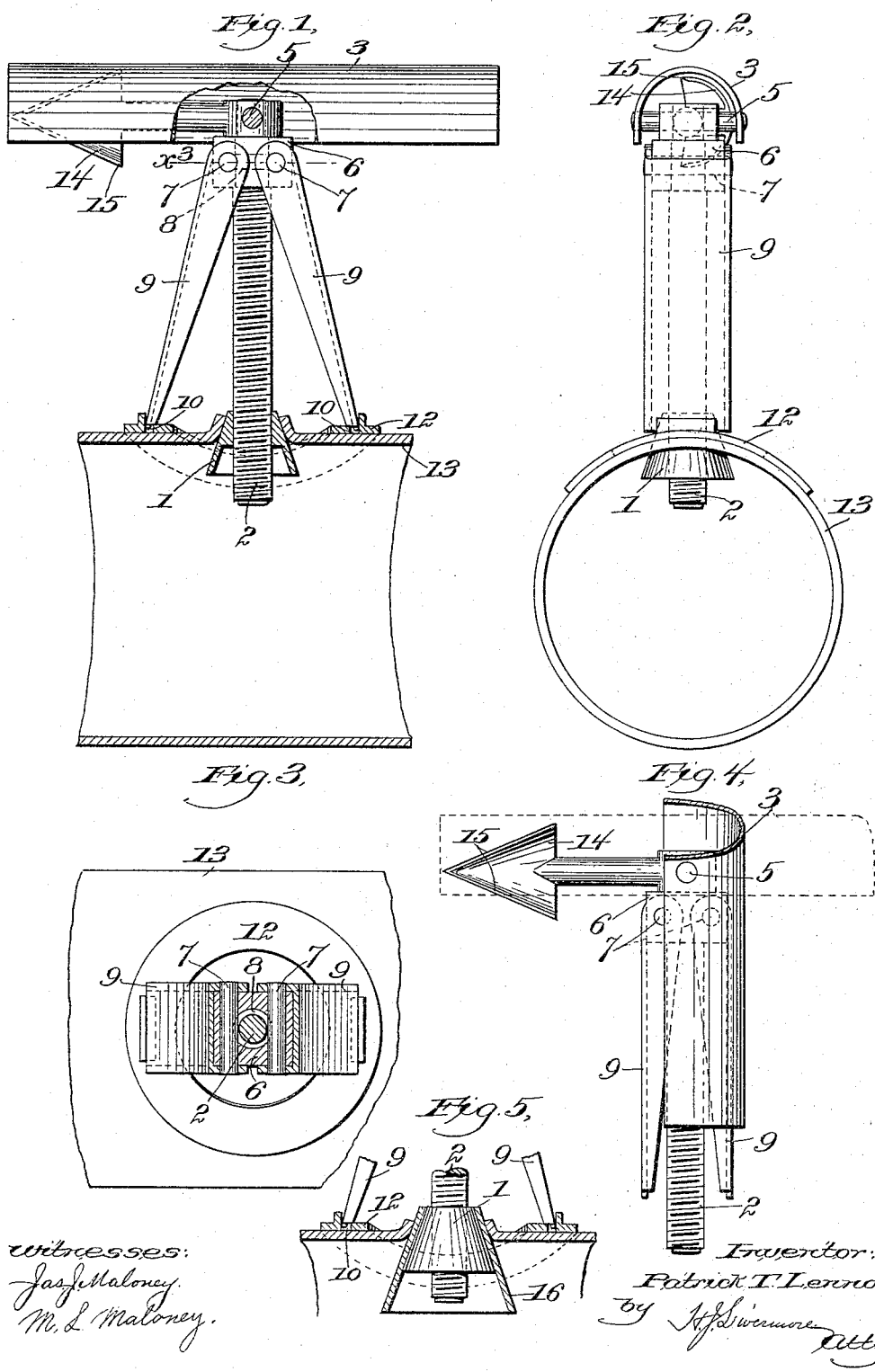

UNITED STATES PATENT OFFICE.

PATRICK T. LENNON, OF HARTFORD, CONNECTICUT, ASSIGNOR TO EMMA E. DONNELLY, OF CENTRAL FALLS, RHODE ISLAND.

IMPLEMENT FOR DRAWING METAL.

1,177,877.　　　　　Specification of Letters Patent.　　Patented Apr. 4, 1916.

Application filed December 12, 1914. Serial No. 876,950.

*To all whom it may concern:*

Be it known that I, PATRICK T. LENNON, a subject of the King of Great Britain, residing in Hartford, in the county of Hartford and State of Connecticut, have invented an Improvement in Implements for Drawing Metal, of which the following description, in connection with the accompanying drawings, is a specification, like letters on the drawings representing like parts.

The present invention relates to an implement for drawing metal, and is embodied in a hand tool adapted to draw out a projecting tube or nipple surrounding an opening in a lead pipe or trap for the purpose of connecting a branch pipe, the implement being mainly adapted to be used in preparing a pipe or trap, to which a branch pipe may be secured by a so-called wiped joint.

The main portion of the implement consists of a cone shaped drawing member shown as a conical nut in which is threaded a stem provided with rotating means such as a handle, the handle and stem being supported at a fixed distance from the pipe or trap in any suitable way, as by means of a pair of legs pivotally secured to a collar in which the stem is capable of rotating but incapable of longitudinal movement. In the construction shown, the said legs are adapted to rest at their lower ends upon an annular saddle plate which fits the surface of the pipe around an opening previously made, so that when the said stem is turned, the cone, screwed on the threaded stem from the inside, will be drawn longitudinally through said opening.

The handle at the top of the stem is also shown as provided with a reaming tool, for the purpose of enlarging and finishing an opening of sufficient size to admit of the insertion of the threaded stem, the cone-shaped drawing member then being placed inside the pipe or trap and screwed on to the threaded stem.

While the saddle plate may obviously be an integral part of the tool, it is desirable to make it separate, as shown, in order that the tool may be accompanied by different sized saddle plates, to accommodate pipes of different sizes; and the size of the conical drawing member may also be varied by the use of detachable conical sleeves of different lengths.

Figure 1 is a side elevation of a tool embodying the invention, shown as in the operation of drawing the nipple, the cone and the pipe which is being operated upon, as well as the saddle, being shown in section; Fig. 2 is a view mainly in elevation of the tool in operation, shown in a plane transverse to that of Fig. 1; Fig. 3 is a section on line $x^3$ of Fig. 1 looking toward the pipe which is being operated upon; Fig. 4 is a partial side elevation of the implement with the reaming tool in position for operation; and Fig. 5 is a detail of the parts in the position shown in Fig. 1 with an enlarging conical sleeve in use for drawing a nipple of larger diameter.

The tool embodying the invention is shown as provided with an expanding member consisting of a conical nut in which is threaded a rod 2 which is pivotally connected at 5 with a handle 3.

Surrounding the top of the threaded rod 2 below the handle 3 is a collar 6, shown as having transverse pins 7 at opposite sides, the said pins entering a groove 8 formed in the stem 2 above the threaded portion thereof, and thereby constituting means for permitting rotary movement of the rod with relation to the collar, but preventing relative longitudinal movement. For the purpose of holding the collar stationary with relation to the work, I have shown the collar as provided with a pair of legs 9, shown as made of channel iron, and pivoted on the pins 7, so that the pins extend through the flanges at opposite sides, said flanges being cut away at the bottom as best shown in Fig. 1, whereby the ends of said legs when spread apart can be fitted into channels 10 formed in a saddle plate 12 which is preferably detachable and arranged to rest on and fit over the surface of the pipe 13 which is shown as being operated on. The nature of the support, therefore, is such that the legs 9 are held stationary with relation to the pipe while the handle 3 is being turned to turn the rod 2 in the collar 6. By this expedient the rod 2 is held longitudinally stationary so that the turning movement thereof will draw the conical drawing member through an opening previously made in the pipe 13, thereby forming the edges of the opening into a tube or nipple as indicated in Figs. 1 and 5.

The tool is mainly intended for use with lead pipe which is comparatively soft and pliable; and in order to facilitate the original formation of the opening the tool is provided with a reamer 14 shown as a half cone having cutting edges 15, the said reamer being connected to the stem 2 at an angle thereto, so that by turning the handle 3 on its pivot, it can be used to operate either tool.

In the construction shown the two tools are permanently fastened together at a right angle, and the handle which is pivotally connected where they join is a half round channel iron which incloses either tool while the other is being used. When the reamer is in use, as shown in Fig. 4, the legs 9 are folded and inclosed so as to be out of the way.

In the operation, therefore, the tool, as shown in Fig. 4, is used to operate the reamer 14 for the purpose of making a hole, or finishing and enlarging a hole previously made, until it admits of the insertion of the threaded rod 2. The handle is then shifted and the conical drawing cone 1 is threaded on the said rod 2 from the inside and the legs 9 spread to rest on the saddle 12. The turning of the handle then gradually pulls the cone through the opening, drawing the metal into a perfect tubular extension or nipple.

In connection with the tool it is obvious that saddles of different sizes may be supplied for use with pipes of different sizes; and hollow cones 16, as shown in Fig. 5, of various sizes may also be supplied for making larger or smaller tubular extensions or nipples.

What I claim is:—

1. An implement for drawing a flange around an opening through metal, comprising a threaded rod adapted to be extended through the said opening; means for holding said rod lengthwise in a fixed position relative to the surface of the metal without preventing the free rotation of said rod; and a conical nut threaded on said rod and constituting an expanding member adapted to be drawn through the opening by the rotation of said rod.

2. An implement for drawing metal, comprising a threaded rod; a curved annular saddle plate adapted to bear upon the exterior surface of the metal to be drawn; means for holding said threaded rod lengthwise in a fixed position relative to said saddle plate; a conical nut adapted to be threaded on said rod and to bear upon the other surface of the metal to be drawn; and means for rotating said rod.

3. An implement comprising a threaded rod; a conical expanding member screw-threaded on said rod; means associated with said rod for holding the said rod in a fixed position lengthwise with relation to the surface of the metal to be operated on; and a handle member pivotally connected with said rod, substantially as and for the purpose described.

4. An implement for drawing metal comprising a threaded rod; a handle for said rod; a collar surrounding said rod; means whereby said collar is held longitudinally stationary with relation to said rod while said rod is free to turn therein; a support connected with said collar and adapted to hold said collar stationary with relation to one surface of the metal which is to be acted on; and an internally threaded tapered expanding member adapted to bear against the other surface of the metal to be drawn and also adapted to be engaged and operated by the said threaded rod.

5. An implement for drawing metal comprising a threaded rod; a handle pivotally connected to said rod, said handle having a channel to inclose said rod while not in use; a collar surrounding said rod; means whereby said rod is free to turn in said collar without longitudinal movement relative thereto; legs or supports pivotally connected with said collar; an annular saddle-plate adapted to bear on one surface of the material to be operated on, and to surround an opening previously made therein, said saddle-plate having recesses or sockets to receive the ends of said legs; and an internally threaded expanding member adapted to be engaged with the said threaded rod after said rod has been passed through the opening, substantially as and for the purpose described.

6. An implement for drawing metal, comprising a threaded rod provided near the top with an annular channel extending around the rod; a collar surrounding the rod provided with transverse pins projecting into said channel; legs or supports pivoted on said pins; a conical expanding tool adapted to be threaded on the said rod after said rod has been passed through an opening in the metal to be drawn; a saddle-plate or support for the said legs adapted to rest on the surface of the metal around the opening therein, and having recesses to receive the said legs; and one or more conical sleeves adapted to fit over the conical expanding tool to accommodate openings of different sizes.

In testimony whereof, I have signed my name to this specification in the presence of two subscribing witnesses.

PATRICK T. LENNON. [L. S.]

Witnesses:
 FERDINAND D'ESEPO,
 CARMINE CERMOLA.

Copies of this patent may be obtained for five cents each, by addressing the "Commissioner of Patents, Washington, D. C."